United States Patent
Liao et al.

(10) Patent No.: US 6,659,760 B2
(45) Date of Patent: Dec. 9, 2003

(54) MECHANISM FOR MOVING A SCREW ROD RELATIVE TO MOLDS FOR MANUFACTURING PRODUCTS HAVING HOLDS

(75) Inventors: Hsueh-Hsin Liao, Taichung Hsien (TW); Chung-Ming Hung, Taichung Hsien (TW)

(73) Assignee: Taiwan Green Point Enterprise Co., Ltd., Taichung Hsien (TW)

( * ) Notice: Subject to any disclaimer, the term of this patent is extended or adjusted under 35 U.S.C. 154(b) by 249 days.

(21) Appl. No.: 09/925,928

(22) Filed: Aug. 10, 2001

(65) Prior Publication Data

US 2003/0031752 A1 Feb. 13, 2003

(51) Int. Cl.$^7$ ............................................... B29C 45/17
(52) U.S. Cl. ...................... 425/577; 164/346; 425/139; 425/444
(58) Field of Search .......................... 425/577, DIG. 58, 425/444, 139, 150; 164/303, 340, 345, 346

(56) References Cited

U.S. PATENT DOCUMENTS

| | | | | |
|---|---|---|---|---|
| 4,206,799 A | * | 6/1980 | McDonald | 164/341 |
| 4,240,498 A | * | 12/1980 | Frenette | 164/303 |
| 4,889,480 A | * | 12/1989 | Nakamura et al. | 425/577 |
| 5,449,285 A | * | 9/1995 | Choiniere et al. | 425/546 |
| 5,558,887 A | * | 9/1996 | Skufca et al. | 425/418 |
| 5,587,189 A | * | 12/1996 | Niimi | 425/577 |
| 6,126,429 A | * | 10/2000 | Burger et al. | 425/169 |

* cited by examiner

Primary Examiner—Joseph Drodge
Assistant Examiner—Emmanuel Luk
(74) Attorney, Agent, or Firm—Charles E. Baxley

(57) ABSTRACT

A plastic injection molding machine includes a rod having an end engaged with a slide member located beside the lower mold, and a position block connected to the upper mold. A pin is movably inserted in two respective inclined holes in the position block and the slide member so that the threaded section on the tip end of the rod is moved into the cavity with the movement of the slide member. The rod is located between two side members each have a threaded semi-circular recess. Another threaded section has the same threads of the thread section on the tip end of the rod is engaged with the two threaded semi-circular recesses so that the rod is rotatably withdrawn from the cavity smoothly when the rod is rotated by a motor.

4 Claims, 4 Drawing Sheets

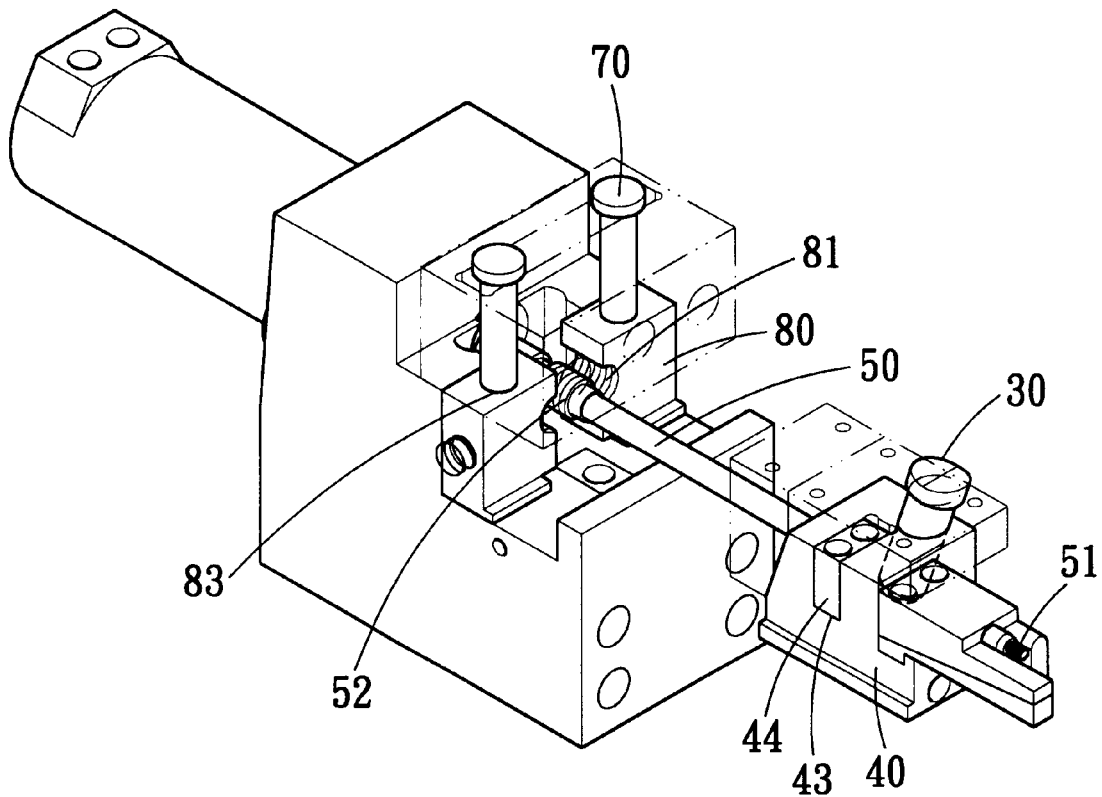
F I G. 2

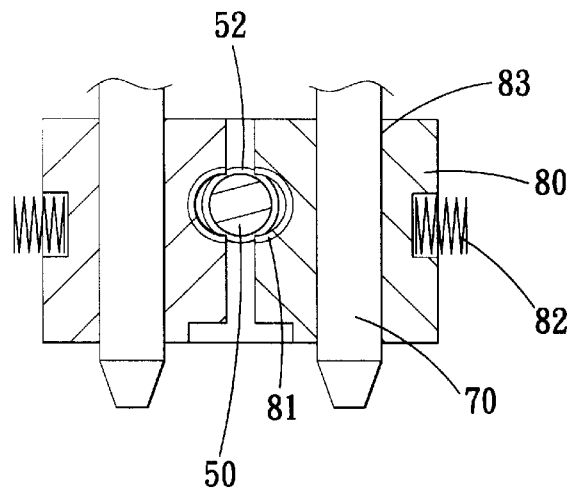
F I G. 3
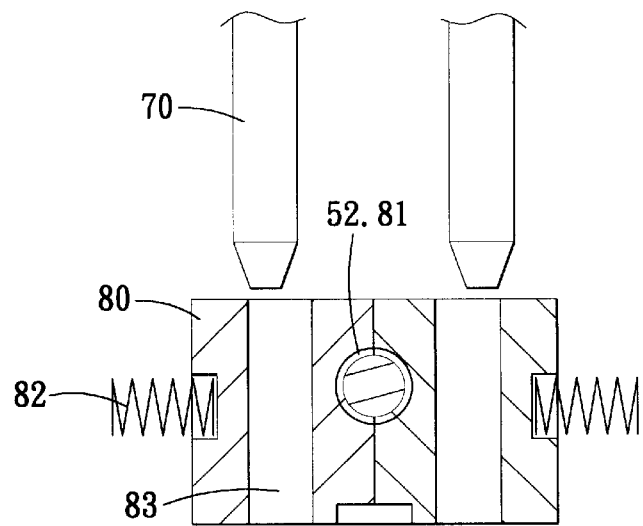
F I G. 5

MECHANISM FOR MOVING A SCREW ROD RELATIVE TO MOLDS FOR MANUFACTURING PRODUCTS HAVING HOLDS

FIELD OF THE INVENTION

The present invention relates to a mechanism in a plastic injection machine and the mechanism ensures the screw rod to be precisely moved together with the open and close of the molds.

BACKGROUND OF THE INVENTION

A conventional plastic injection molding machine for manufacturing products having screw holes generally employs a gear system for controlling a screw rod moving into or removing from the cavity between two molds. The gear system is controlled by electric control system. The gear system including too many gears which is a load of maintenance. The gear system is difficult to precisely move the screw rod relative the molds so that the depth of the screw rod in the cavity cannot be obtained the same each time when the plastic material is injected into the cavity. The screw hole of the products could be damaged if the screw rod cannot be removed from the molds in stable. The gear system is activated after the movement of the molds is finished so that it prolongs the period of the complete process.

SUMMARY OF INVENTION

In accordance with one aspect of the present invention, there is provided a plastic injection molding machine which comprises a position block on the upper mold and a slide member on the lower mold. A pin is inserted in the position block and the movable member. A rod extends through the slide member so that the top end of the rod is inserted in the cavity when the pin is inserted in the slide member. Two side members each have threaded semi-circular recesses which are engaged with a threaded section on the rod so that when the rod is rotated by a motor, the rod is smoothly removed from the cavity.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 is a perspective view to show the plastic injection molding machine of the present invention;

FIG. 3 is a cross sectional view to show two side members are moved away from the rod when two pins are inserted in the two respective top holes in the side members;

FIG. 5 is a cross sectional view to show the two side members are biased toward the rod when two pins are removed from the top holes in the side members.

DETAILED DESCRIPTION OF THE PREFERRED EMBODIMENT

Figure 1:
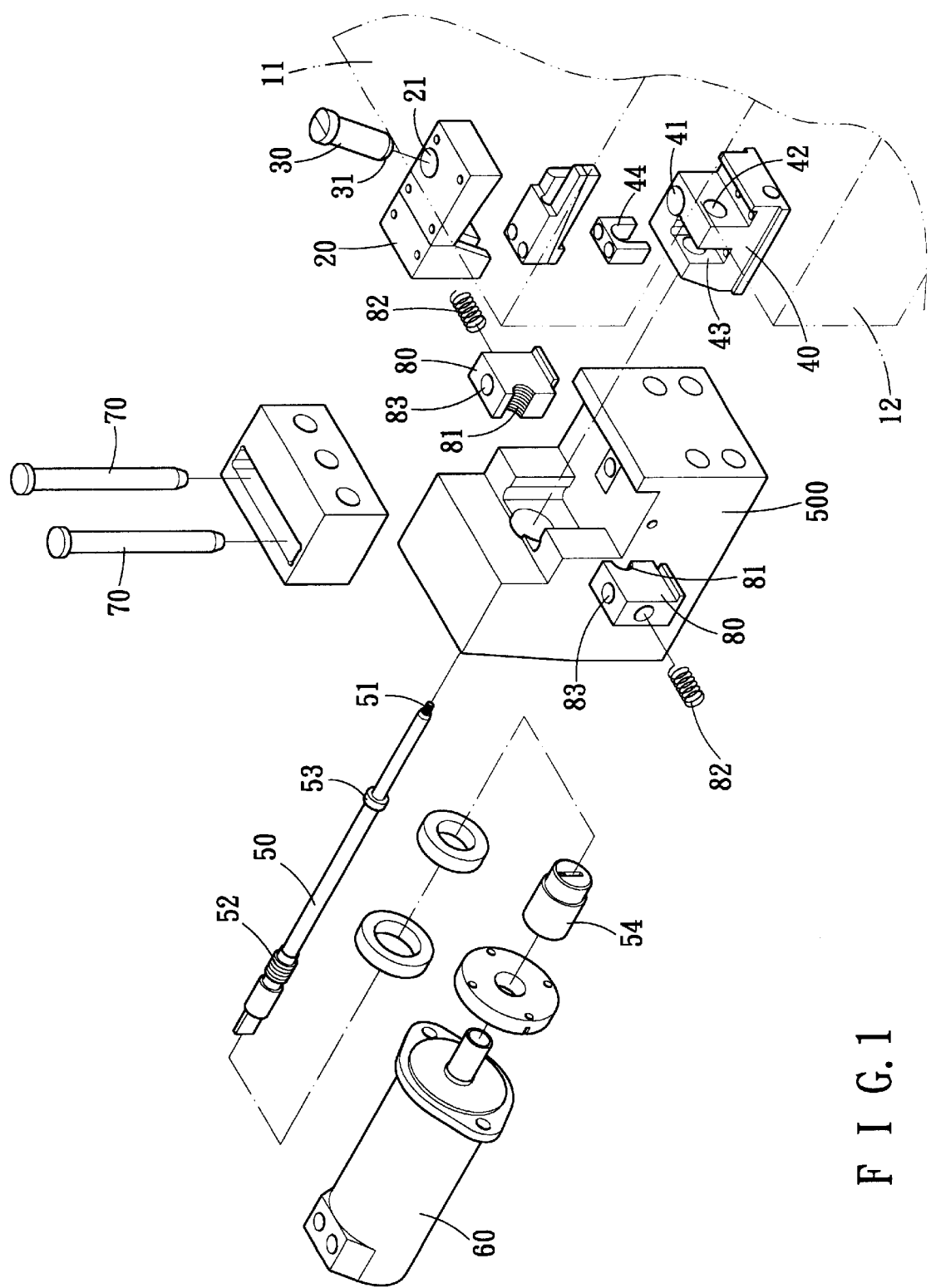
FIG. 1 is an exploded view to show the plastic injection molding machine of the present invention.

Referring to FIGS. 1 and 2, the plastic injection molding machine of the present invention comprises an upper mold 11 having a position block 20 connected thereto which has an first inclined hole 21 defined therethrough. A lower mold 12 is located beneath the upper mold 11 and a slide member 40 is located beside the lower mold 12. The slide member 40 has a second inclined hole 41 which is located in alignment with the first inclined hole 21. A pin 30 is movably inserted in the first inclined hole 21 and an end of the pin 30 can be movably inserted in the second inclined hole 41 to move the slide member 40 toward the cavity between the upper mold 11 and the lower mold 12. A recess 43 is defined in a top of the slide member 40 and a U-shaped engaging member 44 is engaged with the recess 43. Two apertures 42 are respectively defined through two parts of the slide member 40 separated by the recess 43.

A base 500 has a rod 50 movably inserted therethrough, and the rod 50 has a first threaded section 51 on a first end thereof and a second threaded section 52 located close to a second end of the rod 50. The first threaded section 52 and the second threaded section 51 have the same thread pitch. A flange 53 extends radially outward from an outer periphery of the rod 50 and is located between the first threaded section 51 and the second threaded section 52. The first end of the rod 50 extends through the apertures 42 of the slide member 40 and the engaging member 44 so that the first threaded section 51 may be located in a cavity between the upper mold 11 and the lower mold 12 and when the plastic material is injected into the cavity, a threaded recess can be formed around the first threaded section 51. The flange 53 is engaged with the engaging member 44 so that the rod 50 is moved with the slide member 40. A sensor 54 and a motor 60 are respectively connected to the second end of the rod 50.

Two side members 80 each have a semi-circular threaded recess 81 and the second threaded section 52 is located between the two semi-circular threaded recesses 81 of the two side members 80. Each of the side members 80 is biased by a spring 82 which urges the side member 80 toward the rod 50. Each of the side members 80 has a top hole 83 and two guide rods 70 are movably inserted in the two respective top holes 83 of the two side members 80. As shown in FIG. 3, when the two guide rods 70 are inserted in the two top holes 83, the two side members 80 are pushed away from the second threaded section 52 of the rod 50. In the meanwhile, the tip end 31 of the pin 30 is inserted into the second inclined hole 41 to move the slide member 40 and the rod 50 so that the first threaded section 51 of the rod 50 is inserted into the cavity and the upper mold 11 and the lower mold 12 are close to each other and plastic material is injected in the cavity.

Figure 4:
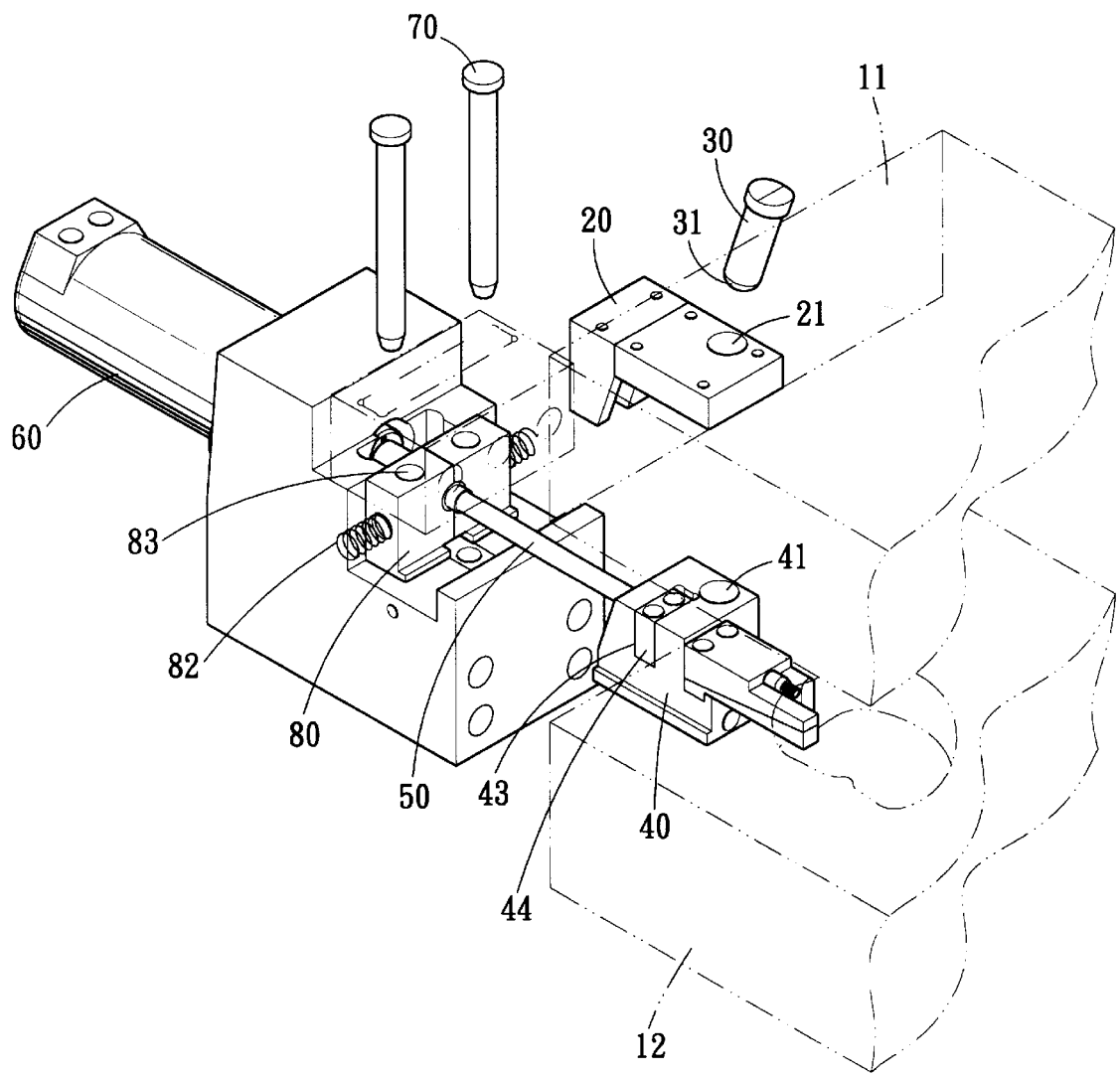
FIG. 4 is a perspective view to show the tip end of the rod is sent in the cavity between the two molds.

As shown in FIGS. 4 and 5, when the upper mold 11 and the lower mold 12 are to be separated from each other, the position block 20 is raised and the pin 30 is removed from the first inclined hole 21 and the second inclined hole 41. The two guide rods 70 are removed from the two top holes 83 of the side members 80 so that the two side members 80 are pushed by the springs 82 and the second threaded section 52 is threadedly engaged with the two threaded semi-circular recesses 81. The motor 60 is then activated to rotate the rod 50 to pull the rod 50 together with the slide member 40 back. The first threaded section 51 is then removed from the cavity. Because the pitch of the first threaded section 51, the second threaded section 52 and the threads in the threaded semi-circular recesses 81 are the same, so that the rod 50 can be smoothly moved back such that the threads formed in the final product will not be affected or damaged. When the rod 50 is moved to a desired position, the sensor 54 sends a message to stop the motor 60.

While we have shown and described the embodiment in accordance with the present invention, it should be clear to those skilled in the art that further embodiments may be made without departing from the scope of the present invention.

What is claimed is:

1. A plastic injection molding machine comprising:

an upper mold having a position block connected thereto which has an first inclined hole defined therethrough, a pin movably inserted in said first inclined hole;

a lower mold and a slide member located beside said lower mold, said slide member having a second inclined hole which is located in alignment with said first inclined hole, an end of said pin movably inserted in said second inclined hole, a recess defined in a top of said slide member and an engaging member engaged with said recess, two apertures respectively defined through two parts of said slide member separated by said recess;

a base having a rod movably inserted therethrough, said rod having a first threaded section on a first end thereof and a second threaded section, a flange extending radially outward from said rod and located between said first threaded section and said second threaded section, said first end of said rod extending through said apertures and said engaging member, said first threaded section located in a cavity between said upper mold and said lower mold, said flange engaged with said engaging member, a sensor and a motor connected to a second end of said rod, and two side members each having a semi-circular threaded recess and said second threaded section located between said two semi-circular threaded recesses of said two side members, said two side members movably engaged with said rod to let said two respective semi-circular threaded recesses engaged with said second threaded section of said rod.

2. The plastic injection molding machine as claimed in claim 1 wherein each of said side members has a top hole and two guide rods movably inserted in said two respective top holes of said two side members.

3. The plastic injection molding machine as claimed in claim 1 wherein each of said side members is biased by a spring which urges said side member toward said rod.

4. The plastic injection molding machine as claimed in claim 1 wherein said first threaded section, said second threaded section and threads in said threaded semi-circular recesses have the same thread pitch.

\* \* \* \* \*